(12) United States Patent
Butler (10) Patent No.: US 9,586,239 B2
(45) Date of Patent: Mar. 7, 2017

(54) THREE WHEEL, MOBILE FRAME (71) Applicant: Donald E. Butler, Westmister, SC (US)

(72) Inventor: Donald E. Butler, Westmister, SC (US)

( * ) Notice: Subject to any disclaimer, the term of this patent is extended or adjusted under 35 U.S.C. 154(b) by 85 days.

(21) Appl. No.: 14/544,720

(22) Filed: Feb. 9, 2015

(65) Prior Publication Data

US 2015/0224547 A1    Aug. 13, 2015

Related U.S. Application Data (60) Provisional application No. 61/966,153, filed on Feb. 13, 2014.

(51) Int. Cl.
| | | |
|---|---|---|
| *B62D 61/06* | (2006.01) | |
| *B08B 3/02* | (2006.01) | |
| *B05B 15/06* | (2006.01) | |
| *B62B 1/00* | (2006.01) | |

(52) U.S. Cl.
CPC ............. *B08B 3/024* (2013.01); *B05B 15/06* (2013.01); *B62B 1/00* (2013.01)

(58) Field of Classification Search
CPC . B62K 5/027; B62K 5/05; B62K 5/06; B62K 5/10; B62J 15/00
USPC .................... 180/69.4, 210, 291
See application file for complete search history.

(56) References Cited

U.S. PATENT DOCUMENTS

| | | | |
|---|---|---|---|
| 2,822,062 A | | 2/1958 | Pettit |
| 3,749,175 A | * | 7/1973 | Bower ................. A62C 13/006 169/52 |
| 3,964,563 A | * | 6/1976 | Allen ................... B60G 21/007 180/217 |
| 4,083,495 A | | 4/1978 | Sharp |
| 5,405,086 A | | 4/1995 | Kranzle |
| 5,711,051 A | | 1/1998 | Roden |
| 5,991,968 A | | 11/1999 | Moll |
| 6,776,363 B1 | | 8/2004 | Fallette |
| 7,080,953 B2 | | 7/2006 | DeLane, Jr. |
| 7,954,501 B2 | | 6/2011 | Sprecher |
| 8,444,068 B2 | | 5/2013 | Hahn et al. |
| 2007/0256882 A1 | * | 11/2007 | Bedard ................. B62K 5/027 180/312 |

* cited by examiner

*Primary Examiner* — Davis Hwu
(74) *Attorney, Agent, or Firm* — Stephen R. Chapman (57) ABSTRACT

Three-wheel, mobile frame adapted to secure one or more nozzles, wand, and spray control power, pressure washer to a main spar with a caster type front wheel assembly connected to the main spar and main wheel assembly comprising two axle mounted, main wheels. The spar includes a support leg attached at a point behind the main wheel assembly and descending downward to prevent inadvertent back-tipping of the three-wheel, mobile frame in response to cleaning fluid discharged against the flat surface to be cleaned under pressure from the nozzle when the unit is not fully controlled by the operator. Multiple nozzles may be attached to a nozzle that is attached to the wand in place of a single nozzle.

4 Claims, 9 Drawing Sheets

THREE WHEEL, MOBILE FRAME

PRIORITY CLAIM

This US patent application claims priority of U.S. Provisional Patent Application 61/966,153 filed Feb. 13, 2014 which Provisional Patent Application is hereby incorporated by reference in its entirety as if reproduced in full herein.

FIELD OF THE INVENTION

The field of the invention in generally home maintenance equipment. More specifically it is pressure washer equipment, and specifically it is a three-wheel, mobile frame that facilitates the use of a common, hand-held pressure washer wand as a high pressure water broom or comparable device

INTRODUCTION

Pressure washing devices, particularly those used for private residences and similar structures comprise two main components—a pump to increase output water pressure and a power source, electric motor or gas engine to drive the pump. Commonly, these components are mounted on a light metal, tubular frame. In addition, the device comprises an input hose to deliver water at a relative low pressure (5-10 PSI) from a water source to the pump, and an output element comprising a high pressured hose (1,000-2200 PSI, and greater) to deliver water from the pump to a hand held spray wand. The fittings connecting the high pressure hose to the pump and to the spray wand are high pressure, snap-on connectors, well known to those familiar with the art. The supply hose commonly employs standard threaded connections. The wand, in addition to the high pressure connector comprises a nozzle to direct the spray from the high pressure hose to a surface to be cleaned. Nozzles may be adjustable for spray pattern or fixed with interchangeable units for varying patterns, from a narrow stream to a broad, fan pattern. The wand further usually comprises a handle with a finger/hand operated on-off valve to control the spray.

The frame also frequently comprises a pair of wheels that allows the pressure pump to be moved from one point to another for convenience in washing a structure. The wheels as part of the frame do not produce a truly portable pressure washer. Operating the washer while moving the pump may be awkward and in many instances inconvenient for users.

In operation, even at relatively low pressure the wand is held with one hand gripping the handle/trigger and the other gripping the wand between the handle and nozzle to control and direct the spray to the area to be washed efficiency of cleaning with respect to the washer depends on the pressure and flow rate of water from the nozzle(s). For residential units, pressure varies, by way of illustration, from 750 to 1,000 PSI, with flow from 1.5 to 2.5 gallons per minuet (G.P.M.). Commercial pressure washers deliver 5.0 G.P.M. (or more) at up to 2,800 PSI. Controlling the spray with these outputs requires reasonable strength and experience to avoid damaging surroundings structures, plants, and surfaces with the high pressure water or water and cleaning compounds discharged through the spray nozzle. Operationally, the pressure washer receives its water supply from a low pressure faucet. The water is pressurized by the pump, chemicals introduced to the output stream, and the high pressure solution discharged from a single nozzle. The nozzle is connected to a "stiff" wand unit that also includes a grip and on/off trigger-valve control to control discharge, and the wand is connected to the pump by a relatively short length of high pressure hose. Even a modest flow of, for example 2 GPM delivered at 850 PSI generates significant back-pressure when the surface is relatively close to the sprayer.

PRIOR ART

Commercially Available Technology

Power washers (also power sprayers and water brooms) are widely available in retail commerce in the United States. Among the larger retail suppliers throughout the United States are Home Depot (a major hardware/home and garden retail business incorporated in the state of Georgia) and Lowes Home Centers, LLC, (a similar business entity incorporated in North Carolina). Both entities sell equipment made by a number of manufacturers (frequently recognized by the power (engine), such as Briggs and Stratton. Other manufacturers include, but are not limited to e.g., Simpson, Campbell-Hausfeld. Sales are transacted at retail outlets and on-line by both stores and many other entities on a national scope or regional organizations.

Power washers comprise an electric or gas powered motor or engine that drives a water pump. The pump generally includes a hand held delivery wand with an adjustable nozzle and a length of high pressure hose to transfer water under high pressure from the pump to the wand/nozzle. Commonly, water is supplied from a yard faucet via standard garden house. Most pressure washer units are mounted on some type of tubular frame that includes wheels such that the frame also serves as a hand-truck to move the unit conveniently close to the point of use.

Larger retail suppliers provide an array of parts for many power sprayers: wands, grip handles, valves, fittings, and hoses; however, specialized carts or dollies adapted for washing walks, driveways, athletic courts, and similar outdoor recreation surfaces are apparently not available, either on line or at retail outlets.

One familiar with the art recognizes that, in addition to the larger suppliers named above, as examples only, numerous hardware and home and garden retail suppliers, including dealers representing specific manufacturers provide the same units and parts Patented Technology Pressure washer (or pressure sprayers) as the term is used for home maintenance encompasses wide range of devices, each of which shares at least a common feature: technology related to devices that are used variously to use water under relatively high pressure (and other fluids) to clean relatively large surfaces. It is difficult to describe what precisely comprises a pressure washer or sprayer. It appears reasonable to include additional, related devices as water brooms.

Patented technology, as it relates to pressure washers and related devices seems to be directed to components of a system, more than to a single device. Elements include an array of pressure pumps, specific engines and motors, and nozzles and pressure hoses and connectors. The invention claimed herein does not include such elements, but it is directed to a specific device that is part of a power washer system, dolly or carriage to facilitate use of the combined elements of a power washer.

In the past 50 years, more or less, numerous US patents related to improvements on power systems have issued. U.S. Pat. No. 2,822,061 issued Feb. 4, 1958 to Charles D. Pettit and Echo L. Pettit teaches and describes a vacuum mopping device. A squeegee-type mop is combined with a standard vacuum cleaner and described as an improved floor cleaning device. Perhaps this should be viewed as either an improved mop or vacuum; the absence of the use of pressurized water makes consideration as a power washer questionable, but it represents a potential basic reference point. The unit was hand operated with no wheel assembly. In an relatively early version of a power sprayer, Sharp in U.S. Pat. No. 4,083,495 issued Apr. 11, 1978 teaches a spray-type device for cleaning/sweeping walks, driveways and similar areas. The device is attached to a pressurized garden hose (clearly not high pressure). The device is a T-shaped configuration with the "leg" of the T serving as the handle and water input point. The cross arm of the T is connected to the leg water source and delivers water to the surface by spray nozzles. Casters, to facilitate moving the device over the surface to be cleaned, are mounted on each end of the T cross arm. U.S. Pat. No. 7,080,953 issued Jul. 25, 2006 to DeLane describes and teaches an aqua-broom with an optional engine pump liquid pressure system. The basic device comprises a common "push broom" fitted with a water supply pipe connected to a (pressurized) water source on which are positioned spray nozzles. The device is not supported by any wheel/carriage system. Schommer described and claimed a push mop fitted with wheels on the handle and a flow-controlling handle grip designed for water conservation.

U.S. Pat. No. 7,954,501 issued Jun. 7, 2011 to Sprecher describes an improved water (spray) distribution device for a pressure washer. The device comprises a splitter that divides fluid discharge among a plurality of nozzles maintaining relative uniform pressure among the nozzles at any angle or distance from the target surface. The device is mounted on a four wheel, small wagon-like carriage.

U.S. Pat. No. 8,444,068 by Hahn et al. and issued May 21, 2013 describes a dual flow washer in which flow from a high pressure source and from a low pressure source are combined in a single hose from the high pressure source.

Roden in U.S. Pat. No. 5,711,051, issued Jan. 27, 1998, teaches claims a hard surface cleaning appliance. The pressure washer comprises rotating fluid delivery arms with nozzles attached to each end. Arms are positioned in a protective cover, and four wheels are attached to the cover, similar to a walk-behind, rotary lawn mower. U.S. Pat. No. 5,991,968 issued Nov. 30, 1999 to Moll and Crock describes a high pressure cleaning and removal system. The system comprises a housing with a base and walls that describe a cavity which covers the specific area to be cleaned at any specific operating time. Cleaning fluids are discharged under ultra-high pressure in the cavity; a vacuum is generate to remove debris from cleaning from the area. The system is mounted on wheels or otherwise moveable to allow cleaning of large areas. In a simpler configuration, Falletta and Faletta in U.S. Pat. No. 6,766,363 issued Aug. 17, 2004 describe a spray washer carriage attachment for a power washer. The attachment comprises a sheet metal frame formed into a flat deck (top) and angled, splash guard. Wheels are mounted on either side of the frame, and a spray wand is connected to nozzles positioned under the deck. The spray wand serves as the handle by which the carriage is pushed by the operator.

U.S. Pat. No. 5,405,086 issued to Kranzle on Apr. 11, 1995 describes and teaches a high pressure washer (pump and power units) mounted on a frame that can be partially disassembled for storage.

GOALS AND OBJECTIVES AND SUMMARY OF THE INVENTION

A first goal and objective of the invention is a three-wheel, mobile frame designed to support and orientate or aim the wand/nozzle components of a pressure washer actually being used to clean a walk, driveway, patio, outdoor court, or similar areas.

A second goal and objective of the invention is a three-wheel, mobile frame in which the main spar (central axis or backbone) and may be adjusted for operator comfort and in which the operator, propelling the invention across the surface to be cleaned may produce a sweeping (side-to-side) motion to cover different widths of the surface to be cleaned or given additional cleaning attention.

A third goal and objective of the invention is a three-wheel, mobile frame in which the front wheel in a freely turning caster mounted on the front of the frame on the main spar, and the main wheels comprise a pair of wheels mounted on opposite sides of the frame on separate or a common axle and positioned so that when unattended, in conjunction with the front wheel, the three-wheel frame and attached sprayer parts will stand securely on the surface to be cleaned.

A fourth goal and objective of the invention is a three-wheeled mobile frame in which a collapsible leg extends downward, behind the axle of the main wheels, In normal use this leg does not contact the ground, but in the event that water pressure from the spray nozzles forces the front upward (forces the front to "kick-back"), the leg contacts and limits any kick-back, thereby avoiding uncontrolled spraying and possible injury or damage to a surrounding area.

A fifth goal and objective of the invention is a three-wheel, mobile frame in which a control panel is positioned on the main spar at a point near the upper end of the wand when it is positioned to deliver water to the nozzles. The control panel is designed to releasably secure the wand control grip, including the spray control valve or trigger. An auxiliary trigger extension cable is attached to the trigger to position it appropriately for convenient use when the main spar is extended beyond the length of the wand.

A sixth goal and objective of the invention is a three-wheel, mobile frame for use with a pressure washer system in which the pump and power source and not transported with the invention, although they are conveniently moved. The high pressure hose that delivers fluids for spray applications is quite long (25-50 feet) and it is connected to the main spar and then to the wand to deliver the fluid. A guide on the handle of the main spar keeps the hose from interfering with the operator, causing tripping or falling These and other goals and objectives can be satisfied by a mobile frame with three wheels: a front freely swiveling caster and a pair of main wheels, the members of the pair main wheels are mounted, opposing sides of the frame; the main wheels are positioned and functionally supported by a may wheel support that is securely attached to the main spar or backbone of the mobile frame and can be disconnected and folded to facilitate storage of the main frame; in at least one version of the invention, the central spar is made of two telescoping sections such that the length of the central spar, hence of the mobile frame can be extended or reduced. Vertical positioning of the main wheel axle allows the operational height of the device to be modified for the comfort and convenience of the operator; a collapsible support leg is attached to the central spar at a point behind the main wheels; when the three-wheeler, mobile frame is in use, the distal end or foot of this leg does not contact the ground, but when it is unattended, it provides support to prevent the frame from falling backwards; of more importance, it prevents the front of the from where the power spray nozzle is positioned from pitching upward if the operator should loose control of the grip on the back end of the central spar, or stumble, trip or fall; this minimizes potential damage to surroundings areas or materials from miss-directed, high pressure spray from the spray nozzle and injuries; the leg limits the upward angle of spraying. The main spar further comprises a cradle system to secure the wand of a "standard" pressure washer along its length with either the wand connected to the nozzle unit of the standard pressure washer in front of the front wheel assembly at an adjustable angle thereby allowing the nozzle to deliver cleaning fluid at high pressure to a surface to be cleaned.

The single nozzle may be replaced by a spray unit comprising several nozzles; this unit is attached to the wand in a manner similar to the single nozzle and connected to the front of the frame, in lieu of the single nozzle. An extended length of pressure hose (40-75 ft, or 12-21 m) compared to the usual length for hand operations (6-10 ft, or 2-3 m) connects the pressure motor/pump unit to the wand and the pressure hose is relatively easily pulled behind the three wheel, mobile frame three-wheeled, mobile frame with the pressure hose and nozzle attached moves over the area to be cleaned, eliminating the effort and nuisance constantly having to move the motor/pump unit. A control panel to which the wand control grip is releasably attached is secured to the central spar below the spar grip and can be rotated for left or right hand use; the main wheel supports can be disconnected for storage along the main spar and, if lengthened, can be telescoped into the bottom section for storage and convenience in carrying the frame; the wand and nozzle are readily attached/unattached from the central spar cradle in which the are positioned for spraying/cleaning functions and attached to the pump for other washing/spraying purposes, and the normal use length of high pressure hose may be looped around a carrying bracket near the grip handle on the central spar.

BEST MODES AND EXAMPLES

The invention comprises a three-wheel, mobile frame 101 adapted to the support of the wand element of a pressure spray unit, spray nozzle attachments connected thereto, and a water flow control grip to facilitate washing relatively large, flat surfaces by way of example, but not limitation, paved areas such as residential walks, drive ways, outdoor basketball and tennis courts, and residential (and commercial) deck surfaces and comparable courts/recreation areas and facilities.

Figure 1A:
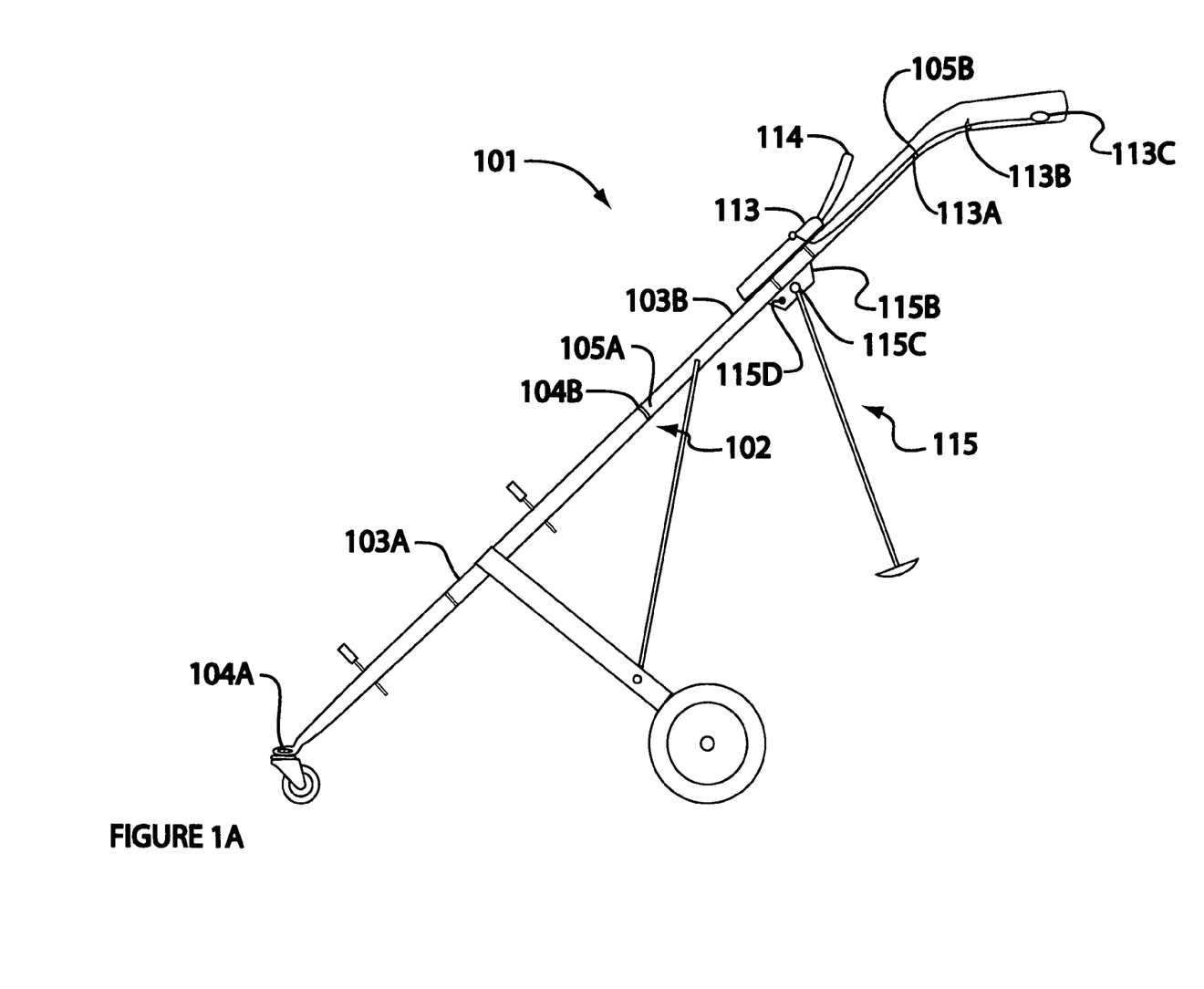
FIG. 1A is an overview of the three-wheel, mobile frame.

The three-wheel, mobile frame 101, FIG. 1A comprises a main spar 102 which is divided into a first and a second section 103A and 103B, respectively. The first and second sections 103A and 103B each comprise, respectively, a first end and a second end 104A and 104B and 105A and 105B. In addition, the first section 103A has a length 106A and the second section 103B has a length 106B.

The first and second sections 103A and 103B of the main spar 102 are commonly fabricated from extruded aluminum, although other acceptable materials, including but not limited to plastics and alloys known to those skilled in the art are not excluded. Such materials are generally available through wholesale and retail plumbing and electric suppliers and building supply outlets.

Figure 1B:
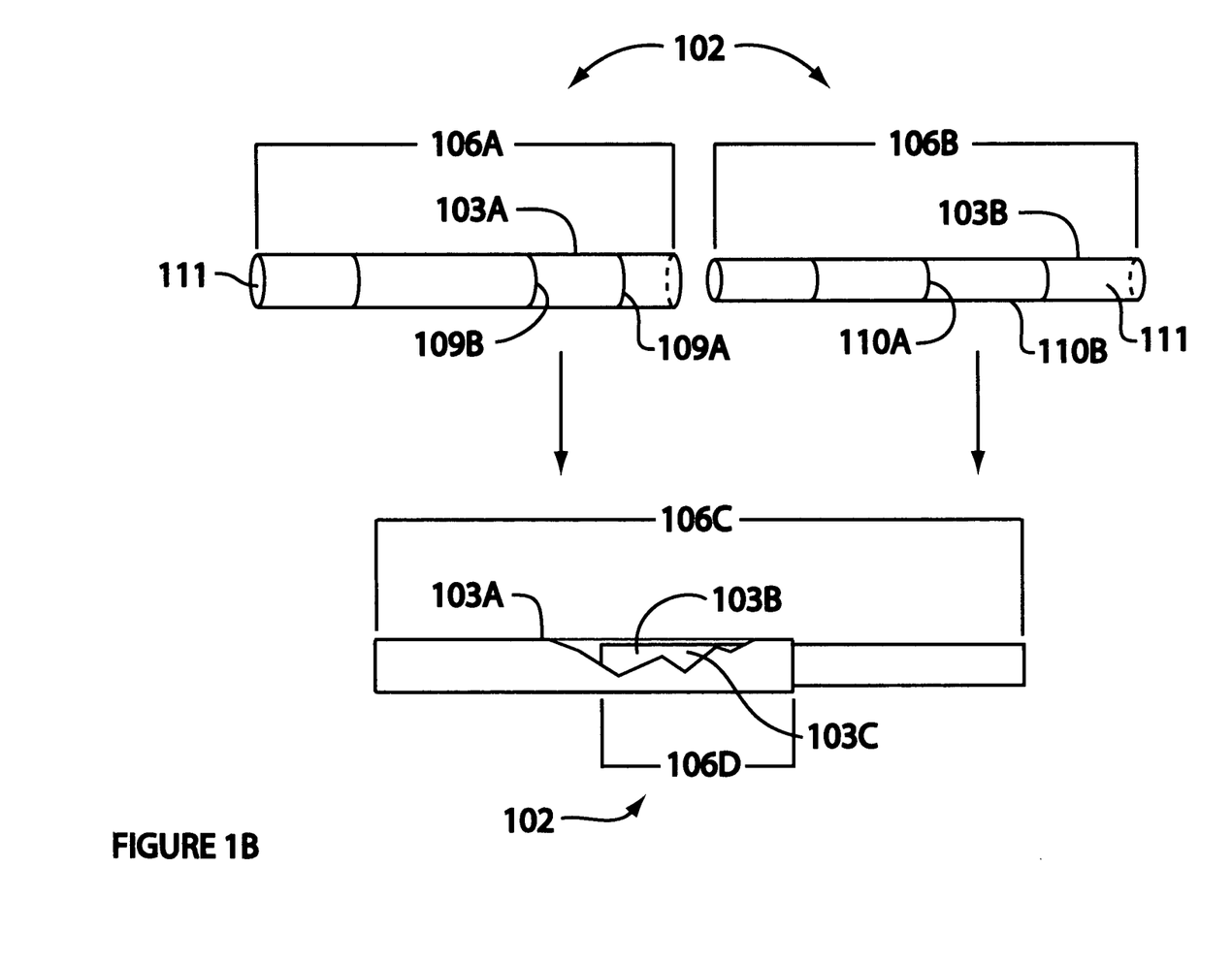
FIG. 1B is a schematic drawing of how the segments of the main spar are connected.

The main spar 102 (first and second sections, 103A and 103B, FIG. 1B) commonly are extruded as a round or rectangular tube in cross-section configuration, or, in cross-section configuration (sides and bottom, but no top) commonly described as a channel iron configuration. Thus, regardless of cross-section configuration, the extrusions all have a open, longitudinal chase, core, channel, or lumen 111. The dimensions of the first and sections are described in terms of inside and outside diameter for round tube, or height and width for rectangular tubes or channel materials. The cross section dimensions of the first and second sections 103A and 103B can be described in terms of the outside and inside dimensions of each section 109A/B and 110A/B, respectfully. The outside dimension 110A of the second section 103B is nominally the same as the inside diameter 109B of the first section 103A. The first end 105A of the second section 103B is positioned in the second end 104B, in the chase or open lumen 111, of the first section 103A and, thereby, the first and second sections 103A and 103B slidably connected and secured with a screw, pin, or merely friction tight, not illustrated. This slidable relationship is limited by the placement of one or more metal screws connecting the first and second sections 103A and 103B and at the same time the overall length 106C of the main spar 102 can be varied and be stabilized. The maximum length of the main spar 106 is equal the sum of the lengths of the first and second sections 106A and 106B, less the minimum length 106C of the second section 106D involved as the female part of the joint between the two sections 103A and 103B, which varies from approximately 15 to 25 percent of the length of the second section 106B. The cut away section 103C shows the length of any position of a (male) segment 103B.

The main spar 102, FIG. 1A, further comprises the wand grip mounting panel 113, a pressure hose guide 114, and a support leg 115. The wands grip mounting panel 113 and pressure hose guide 114 are mechanically, securely attached to the second end 105B of the second section 103B of the main spar. Generally, the grip mounting panel 113 is positioned near the second end of the second section 103B of the main spar 102. The wand spray control grip is part of the pressure washer that functions to connect a pressure-water hose to the wand and thence to the spray nozzle units.

In addition to the connection, the wand spray control grip includes a flow control means, commonly more of an "on-off" valve to control flow of water to the nozzles. In one alternative mode, the wand grip mounting panel 113 comprises a control trigger extension cable 113A to make operation of the valve more convenient to the operator. The cable 113A is connected to the trigger element to the wand grip and extends to the second end 105B of the second section 103B of the main spar 102 through a screw eye 113B or comparable fitting well known to those skilled in the art, terminating in a padded loop 113C. Tension on the cable opens the valve, releasing the tension closes the valve, and the screw eye 113B serves to guide the cable and to prevent the cable from snapping forward, out of the reach of the operator. The pressure hose guide 114 extends outwardly from the three-wheel, mobile frame 101 at the upper edge of the mounting panel. The sole purpose of the pressure hose guide 114 is to hold the pressure hose that connects the wand grip/trigger to the static pressure unit reasonably conveniently, out-of-the-way of the operator. The wand grip handle and hose guide are connected to the mounting panel with releaseable belting material, such as, but not limited to velcro strips. Both the wand grip handle and hose guide can be positioned on either the left or right side or quickly changed.

The support leg unit 115 is part of the main spar 102. The support unit comprises the support leg 115A that is pivotally connected to a support leg clamp 115B that is attached to the second section 103B of the main spar 102 at a point on the bottom center line 115C of the second section 103B. A locking pin 115D holds the support leg 115 in its functional position extending slightly vertically downward, but not contacting the horizontal surface being cleaned when the device is in use. In the event the operator should stumble, slip or trip, or otherwise loose control of the handle at the second end 105B of the second section 103B the support leg minimize the risk of the three-wheel, mobile frame 101 tipping backwards and spraying water (or a cleaning solution) upwards, out of control, potentially causing damage to surrounds and possible injuries.

Figure 1C:
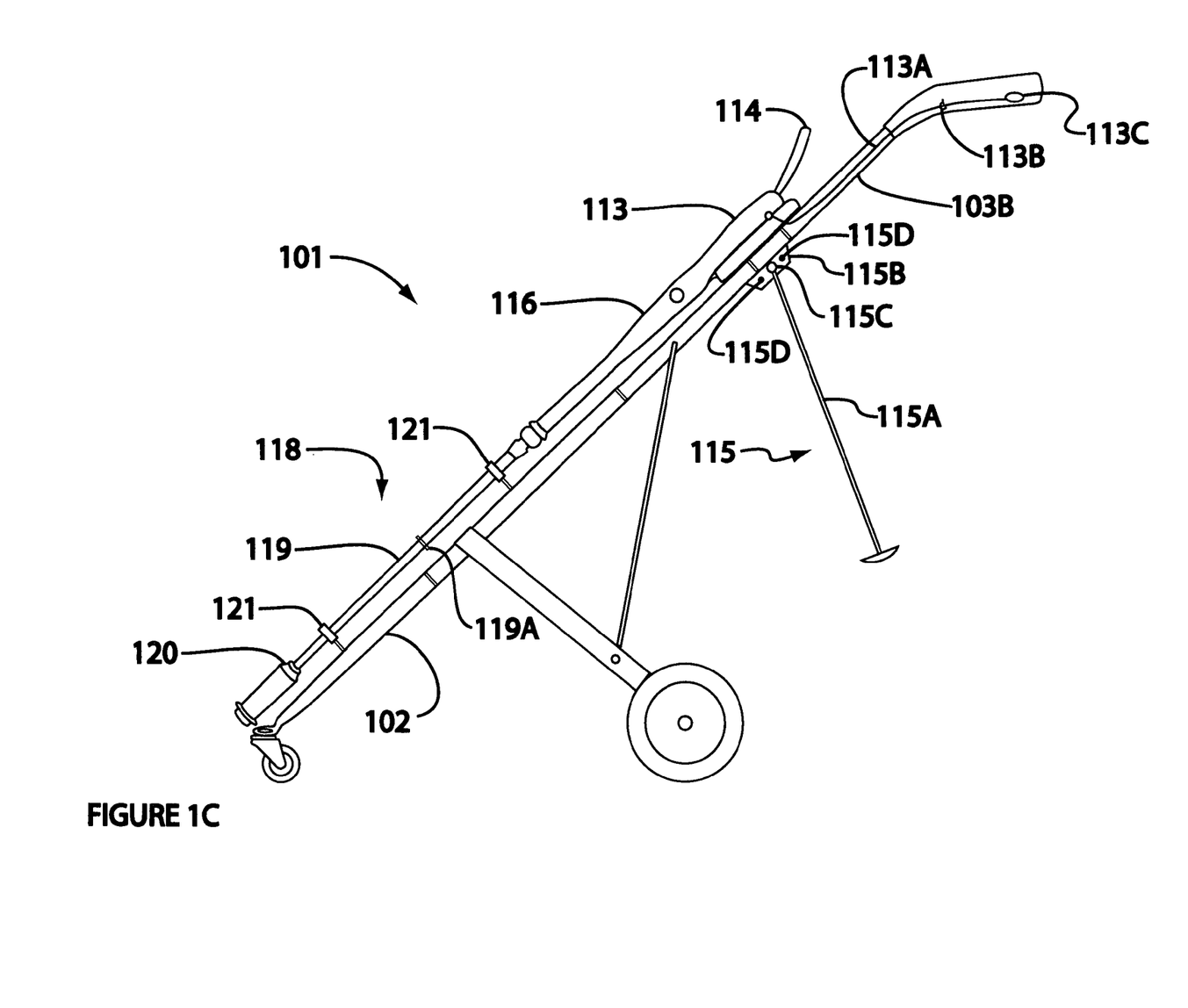
FIG. 1C illustrates the main spar with the spray wand in place.
Figure 1D:
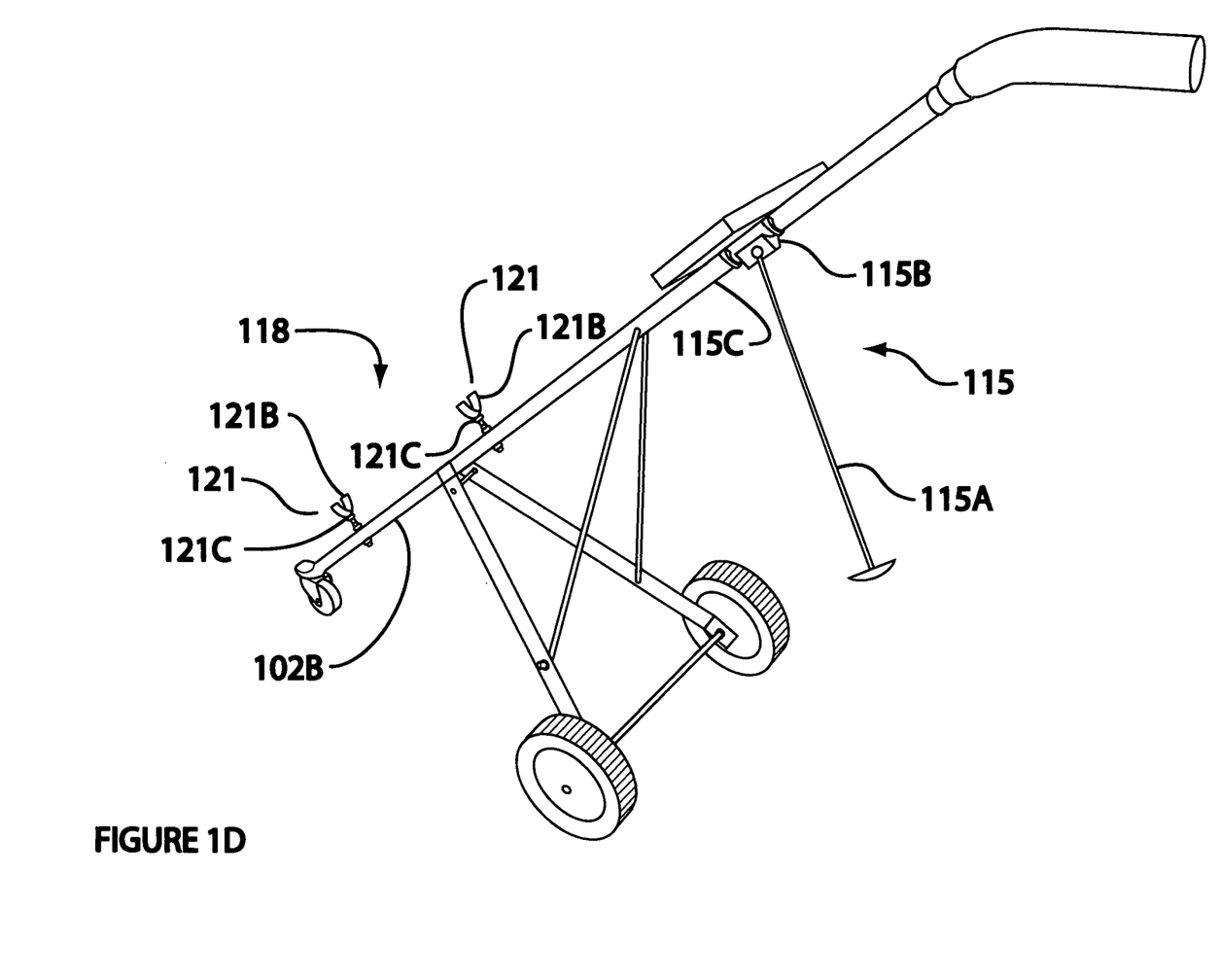
FIG. 1D illustrates elements of the cradle and support leg attached to the cradle.
Figure 1E:
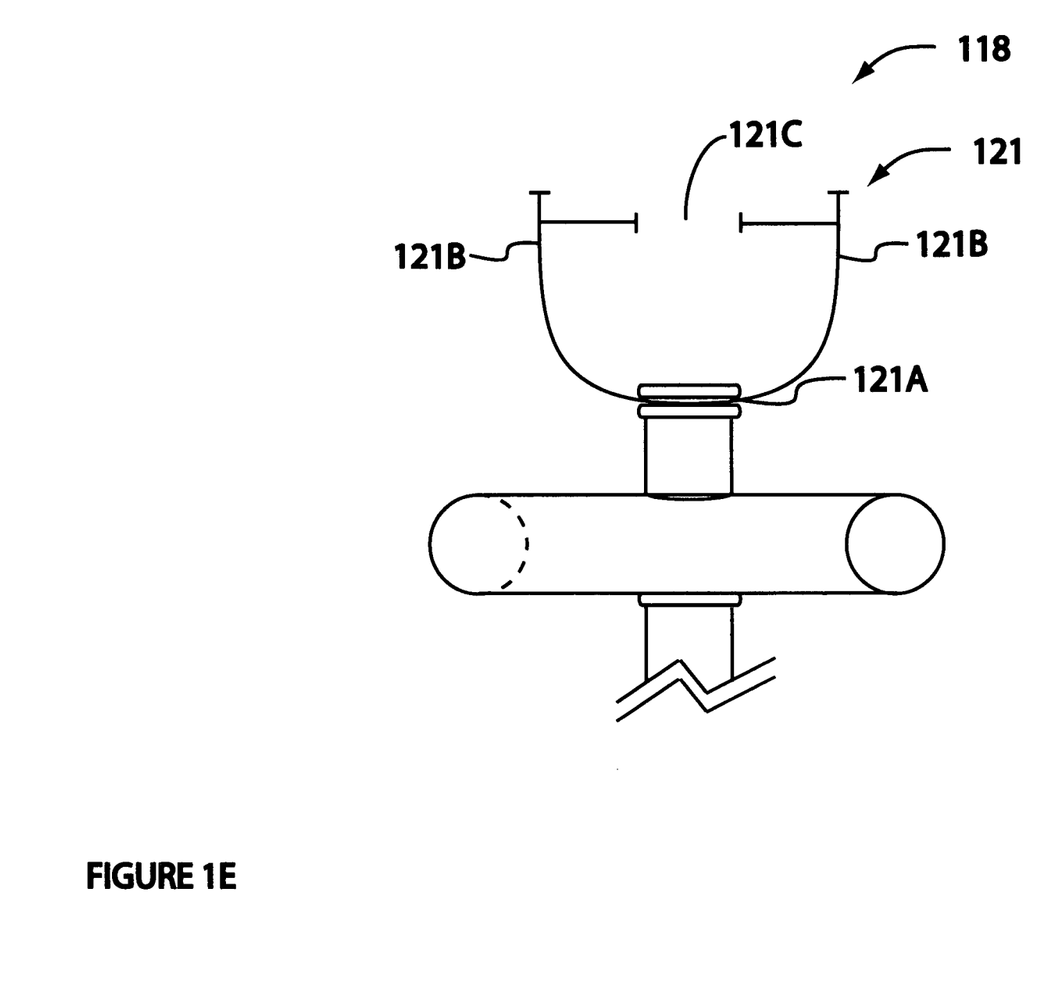
FIG. 1E provides details of the U-shaped clamp element.

As illustrated in FIG. 1C, the main spar 102 comprises a spray wand cradle 118, wand spray control grip 116, a spray wand tube 119, and a high pressure tube connector 120. The spray wand cradle 118, FIGS. 1C and 1D, comprises at least two U-shaped clamp elements 121 each of which is securely attached to the upper surface 102B of the main spar 102 at the base 121A of the U-shaped clamp element 121, with the arms 121B of the U-shaped clamp element 121 extending upward and the base 121A of the U-shaped clamp element 121 oriented parallel to the to the width 121C of the U-shaped clamp element 121. Generally one of the U-shaped clamp elements clamp elements 121 is positioned on the first section 103A and one on the section 103B of the main spar 102. The inside, horizontal dimension 121C of the U-shaped clamp element, the inside width, nominally is equal to the outside diameter 119A of the spray wand tube 119 to be held in the cradle. The spray wand tube 119 is physically connected to the main spar 102 by ease release fabric (velcro, for example) belts or straps that are attached to the main spar 102 and circumscribe the spray wand tube 119. A high pressure tube connector 120 securely and functionally connects the spray wand tube 119 to the spray nozzle unit 201.

Figure 2A:
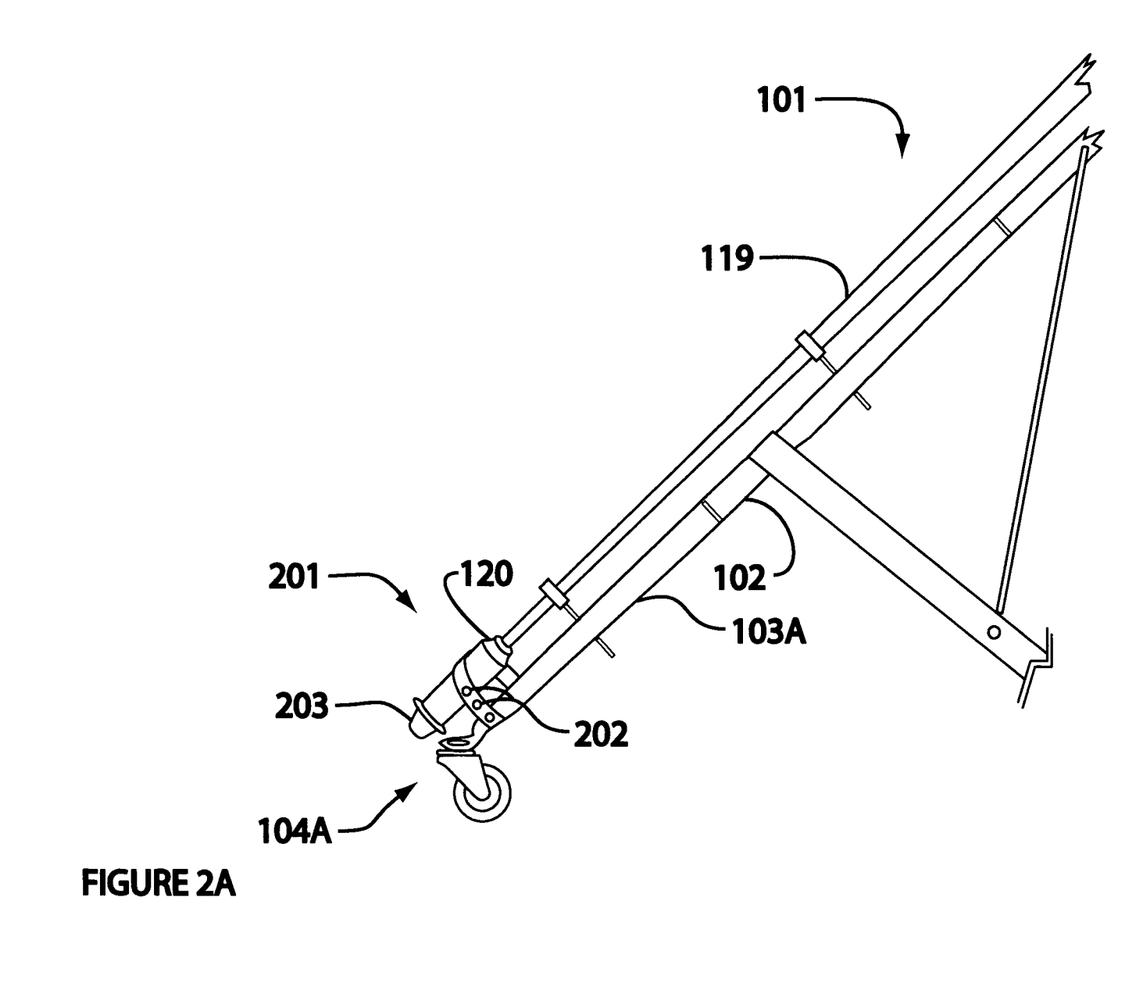
FIG. 2A illustrates positioning of the front wheel assembly and spray assembly, and includes the spray wand.
Figure 2B:
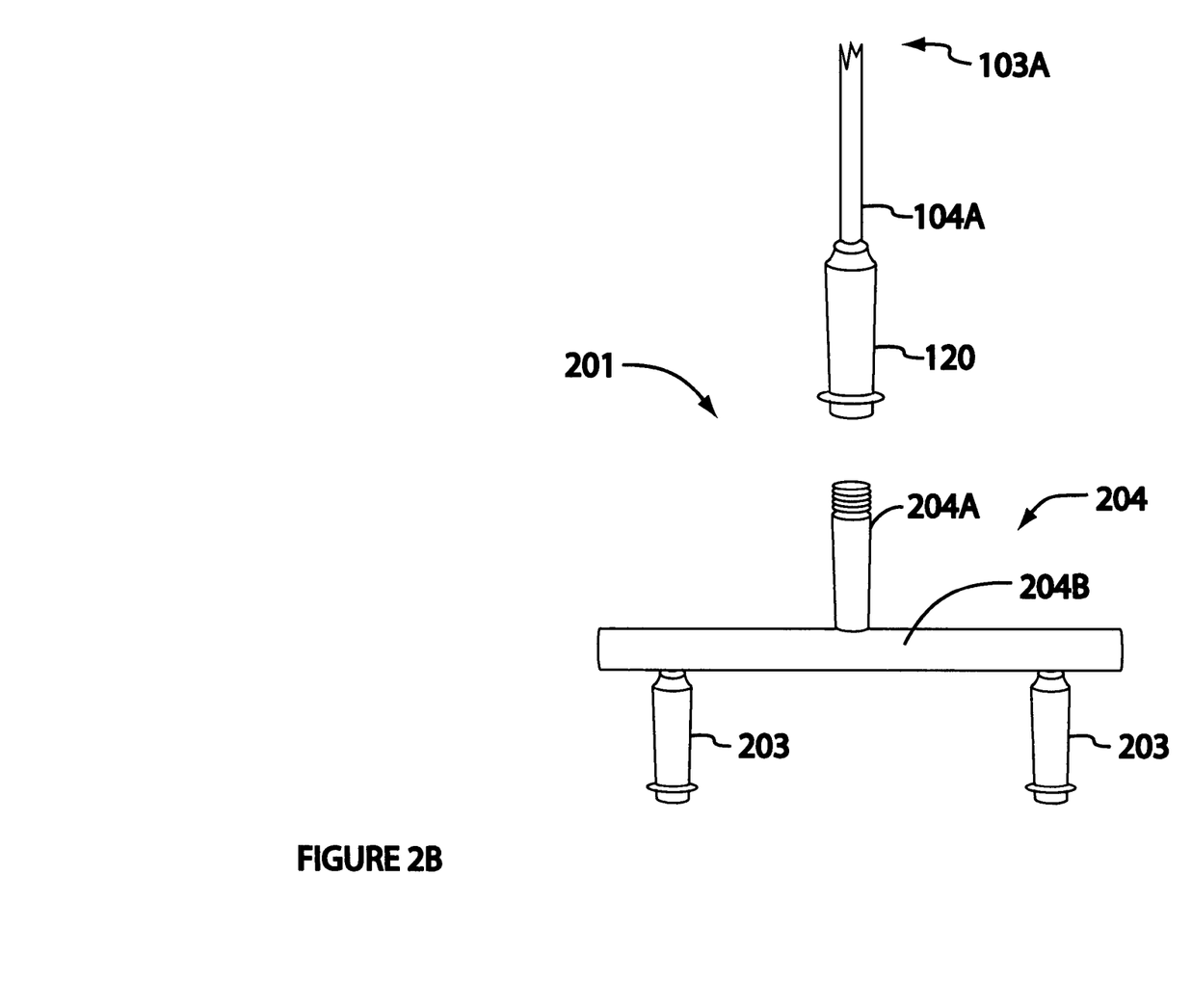
FIG. 2B illustrates a spray head assembly with two nozzles and attachment to the wand.

The three-wheel, mobile frame 101 further comprises a spray nozzle unit 201, FIG. 2A. The spray nozzle unit 201 is connected the first end 104A of the first section 103A of the main spar 102. The spray nozzle unit 201 comprises a housing bracket unit 202 and at least one spray nozzle 203. In a best mode in which the spray nozzle unit 201 comprises only a single spray nozzle 203, FIG. 2A, the spray nozzle 203 is connected directly to the spray nozzle tube 119 by the high pressure tube connector 120 FIG. 2B. In an alternative best mode in which the spray nozzle unit comprises two or more spray nozzles 203, FIG. 2B, the spray nozzle unit further comprises a mounting-T 204 in which the leg 204A of the mounting-T 204 is connected to then high pressure connector 120, and the individual nozzles are threaded to the cross-arm 204B of the mounting-T 204. The mounting-T 204 and high pressure tube connectors 120 are commonly manufactured from brass, or comparable rust/corrosion resistant materials as one skilled in the art understands. Both ends of the mounting-T 204 cross-arm 204B are securely sealed, and cleaning solution under pressure is delivered through the spray wand tube 119 to cross-arm 204B of the mounting-T 204 and via the cross-arm 204B to the individual nozzles 203.

Figure 3:
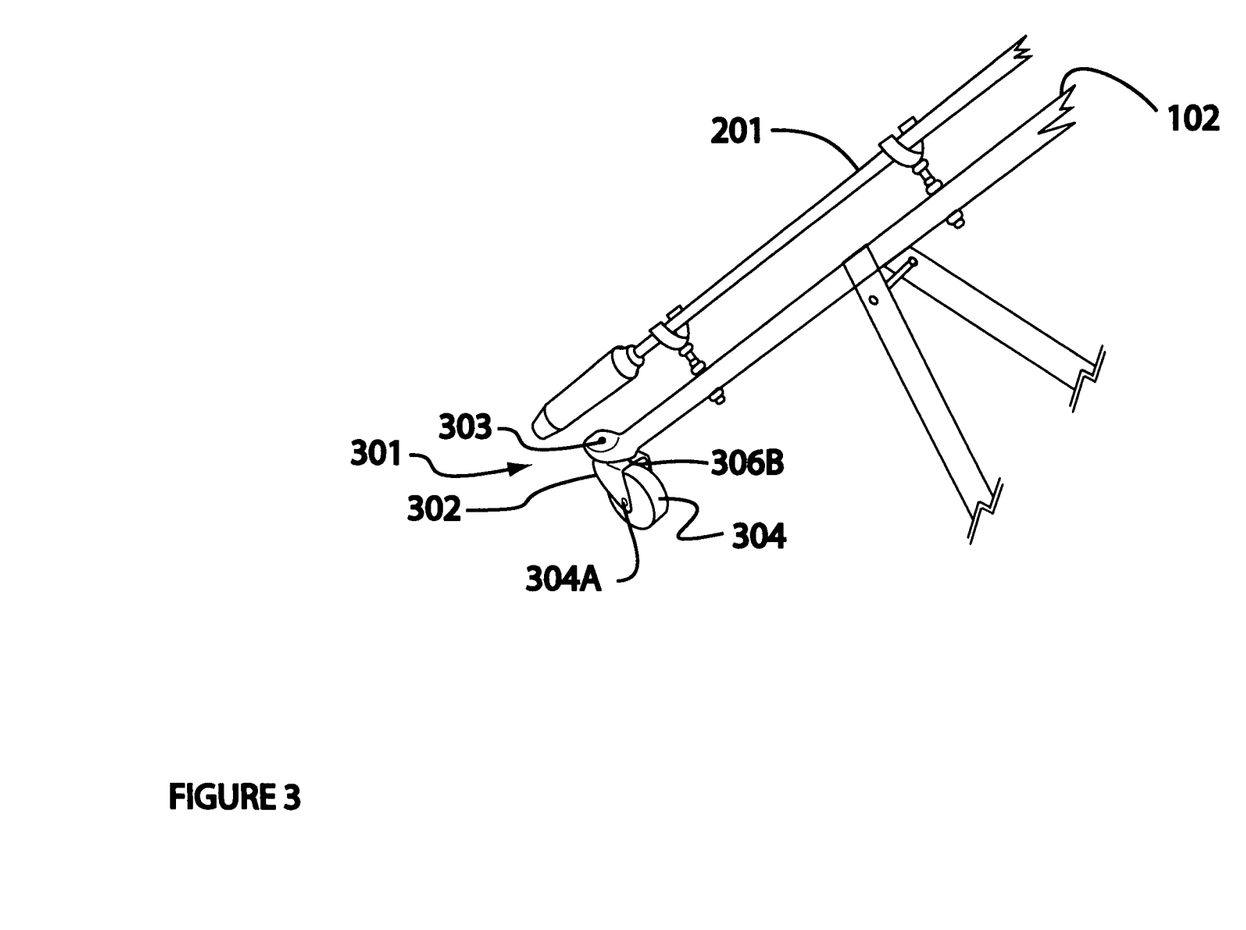
FIG. 3 provides details of the front wheel assembly.

The three-wheel, mobile frame 101 FIG. 3 further comprises a front wheel assembly 301 that comprises a front wheel mounting bracket 302. The front wheel mounting bracket 302 is securely attached to a pivot point 303 on the main spar 102 behind the spray nozzle unit 201. The front wheel assembly 301 further comprises a single wheel 304 mounted on an axle 304A. The front wheel assembly 301 is secured and mounted such that the wheel freely rotates through a 360 degree horizontal plane. One of average skill in the art recognizes that many commercially available "casters" satisfy the described front wheel and can be adapted directly for use as the entire front wheel assembly, requiring only minor, but specific modification of the front wheel assembly 301 front wheel mounting bracket 302 specific for the caster. Such casters are specifically included as appropriate front wheel assemblies requiring no further details or justification.

Figure 4:
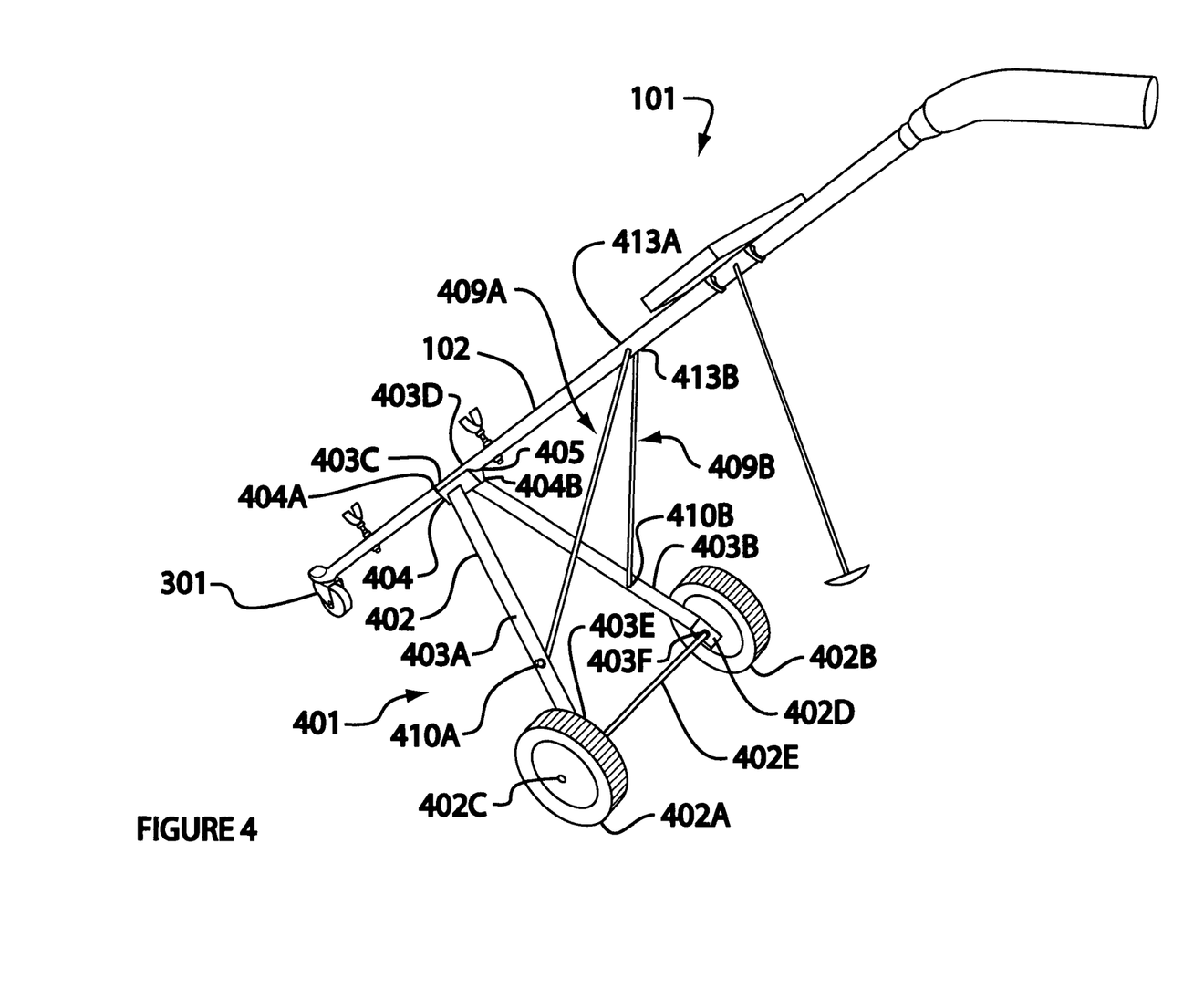
FIG. 4 provides details of the main wheel assembly and supports.

The three-wheel, mounting frame 101 FIG. 4 further comprises a main wheel assembly 401. The main wheel assembly 401 comprises a wheel mounting frame 402 fabricated preferably aluminum tubing, and further comprises a pair 402A/B of wheels, wherein each wheel 402A and 402B includes an axle mounting bushing 402C and 402D and an axle 402E. Generally the wheel have solid rubber tires and vary by way of example, not limitation from 4 to 10 inches (10 to 26 cm), preferably about 6 to 8 inches (16 to 21 cm) in diameter.

The mounting frame 402 may be viewed somewhat as an inverted, block-V. The mounting frame 402 comprises a first leg 403A and a second leg 403B; each leg 403A and 493B has a first end 403C and 403D, respectively, and a second end 403E and 403F. The second end 403E of the first leg 403A and the second end 403F of the second leg 403B are securely attached to the opposing sides 404A and 404B of the leg connector element 404. The leg connector element is similarly securely attached to the main spar 102 at a point 405 on the bottom of the first section 103A of the main spar 102. The first and second legs 403A and 403B descend from the leg connector 404 at an angle less than vertical (45 to 70 degrees; preferably about 60 degrees, by way of example, not limitation).

Each leg 403A and 403B is further supported by S-shaped wheel mounting supports 409A and 409B. The two wheel mounting supports 409A and 409B comprise the first and second connecting arms 412A and 412B, respectively. The first connecting arm 412A of each wheel of each wheel S-shaped mounting support 409A and 409B is secured "friction tight" at a corresponding connection point 410A or 410B, of the corresponding S-shaped wheel mounting support 409A or 409B. Each connecting point 410A or 410B is an opening (or bore) nominally the same cross-section diameter as the leg 401A or 401B. In the same manner the second arm 412B is at a connection point 413A or 413B, respectively, on the main spar 102. In at least one example of as best mode variation, both wheel supports are removable to facilitate folding along the main spar for storage.

One skilled in the art understands and appreciates that the overall length 306 of the main spar 102, hence of the frame may be modified by increasing or decreasing the joint overlap length 103C, by altering the length of either or both the first 103A and second 103B main spar sections (106A and 106B, respectively). In addition, the height of the main spar may be altered by changing the diameter of the main wheels, or by altering the vertical position of the axle mounting bushings on each leg 403A and 403B. The height (distance above the surface to be cleaned) may readily be modified by adjusting the end U-shaped clamp element 121.

It is to be recognized and understood that the preceding examples and variations and combinations described above represent only a sample of possible combinations of parts and elements of the invention, and other variations or combinations are impossible and should be included in a broad interpretation of the following claims.

I claim:

1. A three-wheel mobile frame comprising a main spar, a front wheel assembly, a main wheel assembly, and a spray wand cradle; wherein said main spar comprises as first segment and a second segment and wherein said front wheel assembly comprises a single wheel wherein said single wheel turns on a pivot freely through a 360 degree horizontal plane and rolls freely in a 360 degree vertical plane, and further wherein said front wheel assembly is secured to the first end of said first segment of said main spar; and wherein, said main wheel assembly comprises a pair of wheels, wherein each member of said pair of wheels comprises an axle mounting bushing and the members of said pair of wheels share a common axle; said main wheel assembly further comprises a leg connector element with a first end and a second end and further comprises a first leg and a second leg, wherein each of said first leg and said second leg comprises a first end and a second end, wherein said second end of said first leg and said second leg are physically firmly attached to said leg connector element and wherein said leg connector element is physically secured said first segment of said main spar; and further, wherein said first leg and said second leg are connected individually to said main spar by individual, S-shaped, removable wheel mounting supports, and said axle said main axle is functionally positioned in the lower half of each of said first and second legs; finally, said spray wand cradle comprises at least a pair of U-shaped clamp elements wherein each U-shaped clamp element at its base comprises an adjustable connector whereby each U-shaped clamp element is adjustably connected to said main spar; the width of said U-shaped connector element varies and adapted to the specific diameter a given spray wand; a release closure secures said spray wand in each U-shaped, adjustable connector, and at least one U-shaped adjustable, connectors is attached to the first and to the second sections of said main spar.

2. The three wheel mobile frame of claim 1 further comprises a support leg unit, wherein said support leg unit comprises a support leg, a support leg anchor, and a foot, and wherein said support leg anchor is secured near of the second spar segment and the support leg is pivotly connected to said support leg anchor; the maximum arc through which said support leg may swing in a vertical plane is limited by restraints on either side of said anchor; said foot is connected to said second end of said leg.

3. The three wheel mobile frame of claim 1 a pressure washer unit adapted to be secured to is said spray cradle, wherein the first end of the of the first segment of said main spar comprises a spray nozzle unit adapted functionally to secure a single nozzle and said main spar further comprises a wand spray grip control and a high connector that functionally connects a wand spray tube and said spray nozzle unit.

4. The three wheel mobile frame of claim 3 wherein said spray unit is adapted functionally to secure more than one spray nozzle.

\* \* \* \* \*